United States Patent [19]

Cushing et al.

[11] Patent Number: 4,980,819
[45] Date of Patent: Dec. 25, 1990

[54] MECHANISM FOR AUTOMATICALLY UPDATING MULTIPLE UNIT REGISTER FILE MEMORIES IN SUCCESSIVE CYCLES FOR A PIPELINED PROCESSING SYSTEM

[75] Inventors: David E. Cushing, Chelmsford, Mass.; Richard P. Kelly, Nashua; Robert V. Ledoux, Litchfield, both of N.H.; Jian-Kuo Shen, Belmont, Mass.

[73] Assignee: Bull HN Information Systems Inc., Billerica, Mass.

[21] Appl. No.: 286,551

[22] Filed: Dec. 19, 1988

[51] Int. Cl.[5] .............................................. G06F 9/38
[52] U.S. Cl. .................................. 364/200; 364/231.8; 364/228.1; 364/271.4
[58] Field of Search ... 364/200 MS File, 900 MS File

[56] References Cited

U.S. PATENT DOCUMENTS

| | | | |
|---|---|---|---|
| 3,864,670 | 2/1975 | Inone et al. | 364/200 |
| 3,889,237 | 6/1975 | Alferness et al. | 364/200 |
| 3,950,729 | 4/1976 | Fletcher et al. | 364/200 |
| 4,282,572 | 8/1981 | Moore, III et al. | 364/200 |
| 4,760,519 | 7/1988 | Papworth | 364/200 |
| 4,768,148 | 8/1988 | Keeley et al. | 364/200 |
| 4,823,256 | 8/1989 | Bishop et al. | 364/200 |
| 4,928,224 | 5/1990 | Zulian | 364/200 |

*Primary Examiner*—Thomas C. Lee
*Attorney, Agent, or Firm*—Faith F. Driscoll; John S. Solakian

[57] ABSTRACT

A separate register file memory is included in at least two units of a pipelined processor which are located on separate integrated circuit chips. The register file memories of the units are interconnected so as to share certain input data register stages to enable updating to take place within a minimum of time. Each unit has a microprogrammed control unit which automatically provides update commands during the unit's cycles of operation. The signals from each microprogrammed control unit are applied to both register file memories enabling both memories to be updated during successive cycles of operation and thereby function collectively as one unit. This ensures that both units have access to the same most recently updated user visible information enabling both units to complete the execution of different instructions entering pipeline.

19 Claims, 9 Drawing Sheets

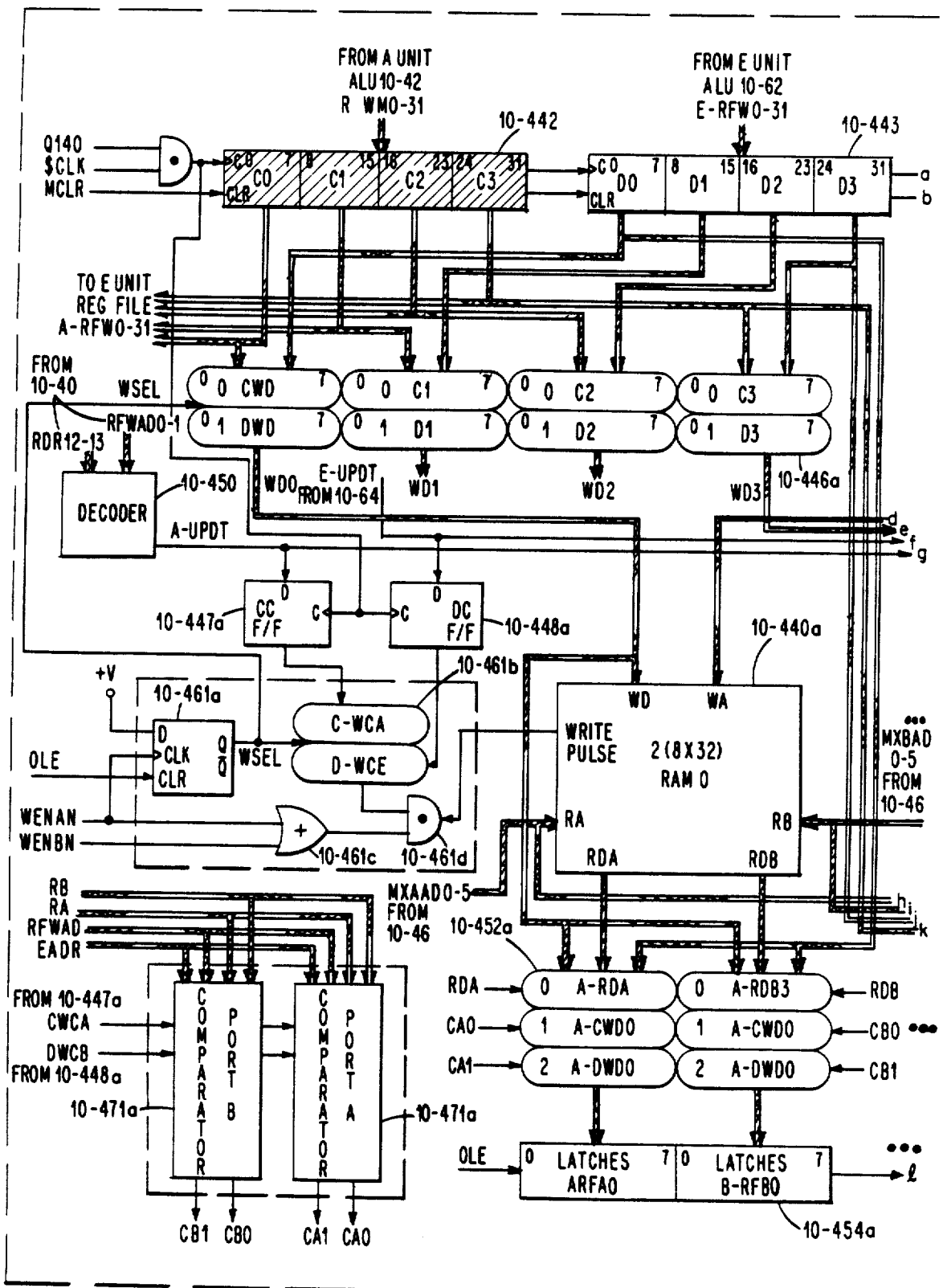
Fig. 2a. (sheet 1 of 2)

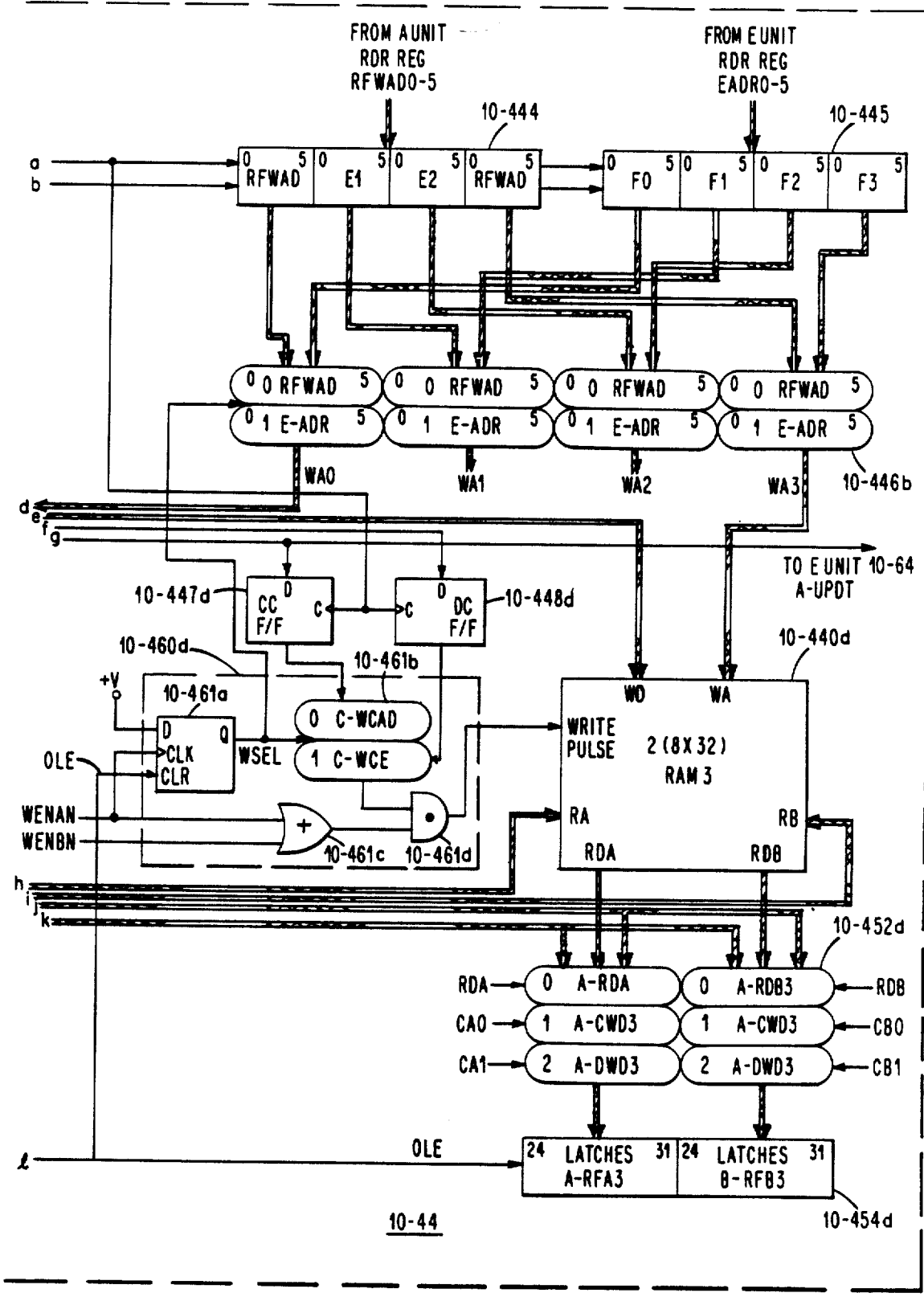
Fig. 2a. (sheet 2 of 2)

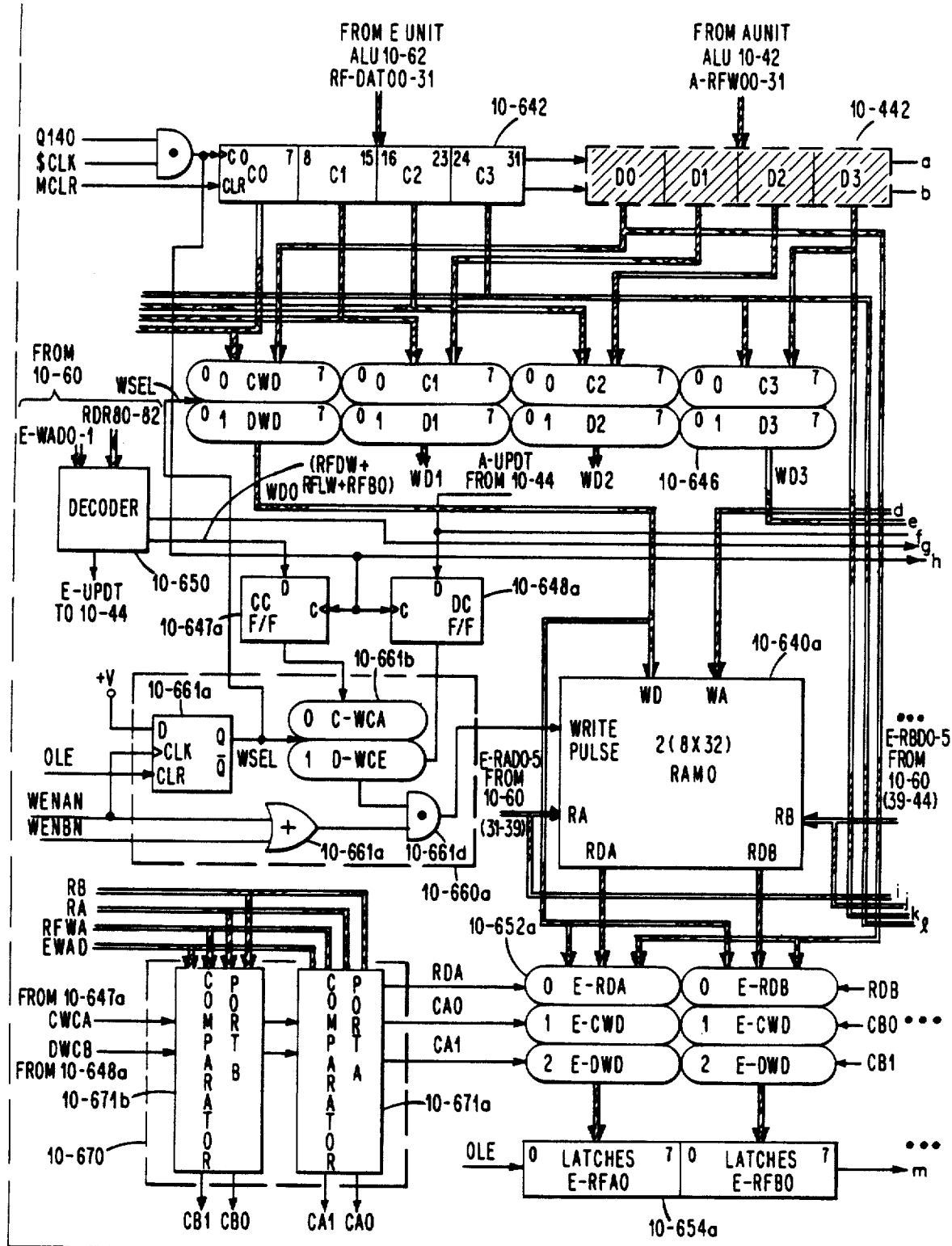
Fig. 2b. (sheet 1 of 2)

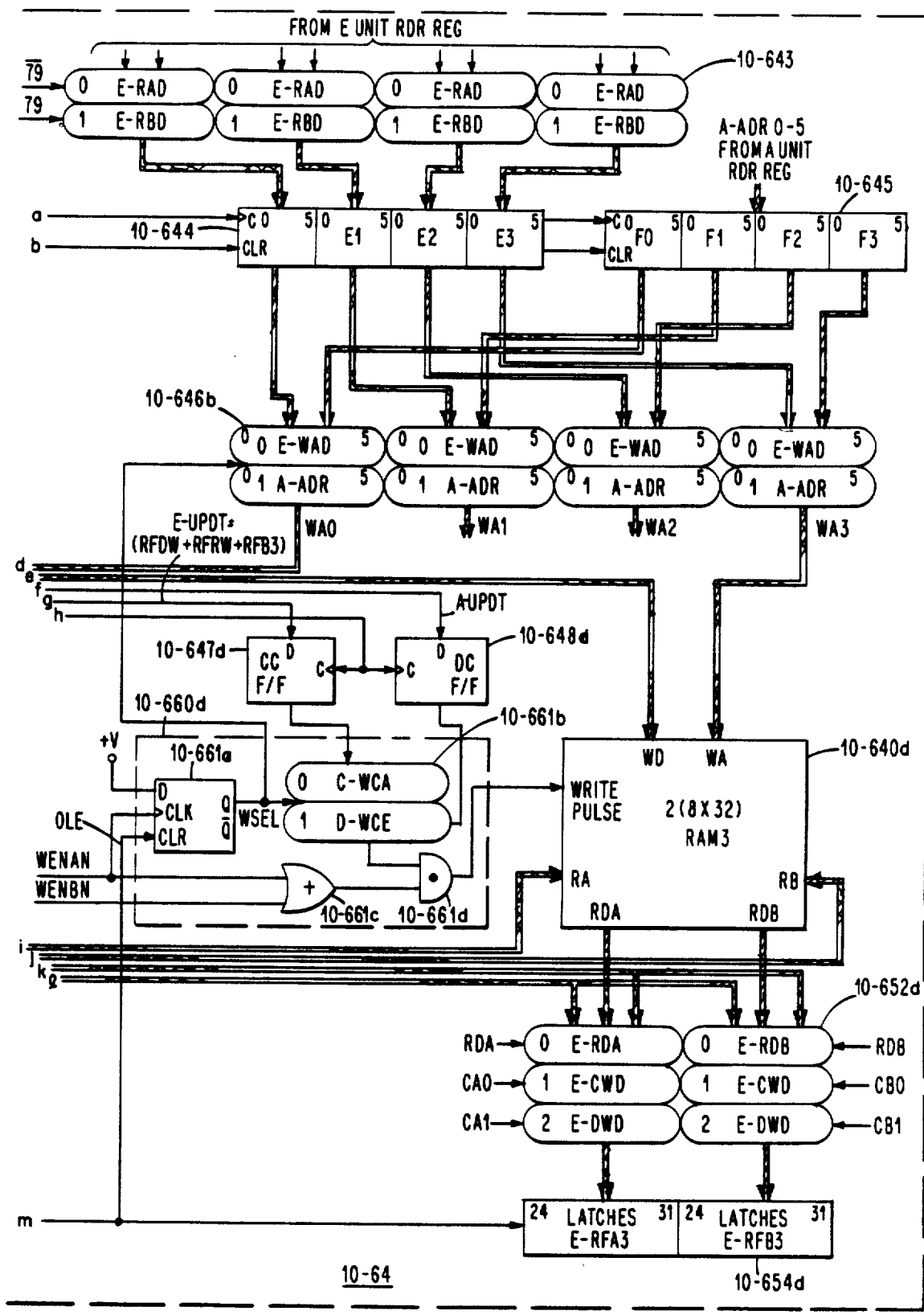
Fig. 2b. (sheet 2 of 2)

Fig. 4.

| | CYCLE 1 | CYCLE 2 | CYCLE 3 | CYCLE 4 | CYCLE 5 | CYCLE 6 | CYCLE 7 |
|---|---|---|---|---|---|---|---|
| I FETCH | LDB1 FETCH INST. FROM INST.BUFFER | LDB2 | LDB3 | ADDR3 FETCH INST. FROM INST. BUFFER | | | |
| I CRACK PORTION OF I UNIT 10-2 | | LDB1 DECODE LDB1 OPCODE; TRANSFER LDB1 INST. TO A UNIT & E UNIT | LDB2 | LDB3 | ADDR3 DECODE ADDR3 OPCODE; TRANSFER ADDR3 INST. TO A UNIT | | |
| A UNIT 10-4 | | | LDB1 GENERATE VIRTUAL ADDRESS | LDB2 | LDB3 | ADDR3 READ OPERAND FROM REGISTER LOC R3 OF REGISTER FILE & PERFORM ADD & STORE RESULT INTO LOC R3 | LDB1 UPDATE CONTENTS OF REGISTER LOC B1 OF REGISTER FILE OF A UNIT |
| VMMU | | | | LDB1 CONVERT VIRTUAL ADDRESS INTO PHYSICAL ADDRESS | LDB2 | LDB3 | |
| OPERAND CACHE UNIT | | | | | LDB1 FETCH SPECIFIED OPERAND FROM CACHE UNIT | LDB2 | LDB3 |
| E-UNIT 10-6 | | | | | | LDB1 STORE OPERAND IN REGISTER LOC B1 OF A UNIT REGISTER FILE | ADDR3 UPDATE CONTENTS OF REGISTER LOC R3 OF E UNIT REGISTER FILE | ns
MECHANISM FOR AUTOMATICALLY UPDATING MULTIPLE UNIT REGISTER FILE MEMORIES IN SUCCESSIVE CYCLES FOR A PIPELINED PROCESSING SYSTEM

RELATED PATENT APPLICATIONS

1. The patent application of Ming-Tzer Miu and Thomas F. Joyce entitled, "Production Line Method and Apparatus for High Performance Instruction Execution," filed on even date herewith, bearing Ser. No. 286,580 which is assigned to the same assignee as this patent application.

2. The patent application of David E. Cushing, Romeo Kharileh, Jian-Kuo Shen and Ming-Tzer Miu entitled, "Dual Read/Write Register File Memory," filed on even date herewith bearing Ser. No. 286,552 now U.S. Pat. No. 4,933,909, which is assigned to the same assignee as this patent application.

3. The patent application of Jian-Kuo Shen, Richard P. Kelly, Robert V. Ledoux and Deborah K. Staplin entitled, "Control Store Addressing from Multiple Sources," filed on even date herewith, bearing Ser. No. 286,578 which is assigned to the same assignee as this patent application.

4. The patent application of Richard P. Kelly, Jian-Kuo Shen, Robert V. Ledoux and Chester M. Nibby, Jr. entitled, "Control Store Double Pump Operation," filed on even date herewith bearing Ser. No. 286,581 now U.S. Pat. No. 4,910,601, which is assigned to the same assignee as this patent application.

5. The patent application of Richard P. Kelly and Robert V. Ledoux entitled, "Control Store Address Generator for Developing Unique Instruction Execution Starting Address," filed on even date herewith, bearing Ser. No. 286,582 which is assigned to the same assignee as this patent application.

BACKGROUND OF THE INVENTION

1. Field of Use

This invention pertains to data processing systems and more particularly, to register storage for the different units within such systems.

2. Prior Art

It is well known to provide scratch pad memories for storing immediate results or for storing the contents of program accessible registers (i.e., program visible registers). In systems which include more than one processing unit, it is essential that each processing unit have access to the most current version of the information stored in so-called user or program visible registers. This requirement is particularly difficult to implement in pipelined processing systems which include a succession of stages, each of which execute a different part of the instructions passed through the processor.

To meet this requirement, some systems provide a single register field memory accessible by both units. The disadvantage of this type of arrangement is that there may be significant delays incurred when the processing units are embodied in separate integrated circuit chips.

Another pipelined processor includes register file memories in two stages of the processor in which only one of the units, the execution unit, maintains the true contents of registers which are updated only as a result of instruction execution. At the completion of such execution, the updated data register contents are transferred through several register stages and buses for distribution to the register file memory of the other pipeline stage. For further information regarding this arrangement, reference may be made to U.S. Pat. No. 4,760,519 which issued on July 26, 1988.

The main disadvantage of the above arrangement is that it is not suitable for a system in which instructions are executed in an order which is different from the order in which the instructions are introduced into the pipeline. This type of system is disclosed in the related patent application of Ming-Tzer Miu and Thomas F. Joyce entitled, "Production Line Method and Apparatus for High Performance Instruction Execution." In this type of system, it is essential that each register file memory contain the same contents during any given cycle of operation or performance could be substantially affected, particularly when the units are constructed from separate integrated circuit chips.

Accordingly, it is a primary object of the present invention to provide a register file memory which can be utilized by two different units.

It is a more specific object of the present invention to provide a register file arrangement for enabling access to the most recent information by a number of units which are located on separate integrated circuit chips.

SUMMARY OF THE INVENTION

The above objects and advantages are achieved in a preferred embodiment of the present invention in which a separate register file memory is included in at least two units of a pipelined processing unit. The register file memories are constructed according to the teachings of the copending related patent application of David E. Cushing, et al. titled, "A Dual Port Read/Write Register File Memory." The register file memories of the units are interconnected to enable updating to take place within a minimum of time.

In the preferred embodiment, each unit has a microprogrammed control unit which automatically provides update commands during the unit's cycles of operation. The signals from each microprogrammed control unit are applied to both register file memories enabling the content of shared storage locations of both memories to be updated during each cycle of operation. This ensures that both units have access to the same most recently updated shared information. In the preferred embodiment, each register file includes a number of private locations which are used only by each unit. Both register file memories receive a set of common timing and control signals to ensure that updating is properly synchronized.

The arrangement of the present invention enables the automatic updating of register file memories located in units embodied on different integrated circuit chips so that the register file memories operate collectively as a single register file memory. This enables both units of a pipelined processing unit to complete the execution of different instructions entering the pipeline.

The novel features which are believed to be characteristic of the invention both as to its organization and method of operation, together with further objects and advantages, will be better understood from the following description when considered in connection with the accompanying drawings. It is to be expressly understood, however, that each of the drawings is given for the purpose of illustration only and is not intended as a definition of the limits of the present invention.

BRIEF DESCRIPTION OF THE DRAWINGS

FIGS. 2a through 2c show in greater detail, the register file memories and timing generator circuit of FIG. 1.

FIG. 4 is a diagram showing the processing of a sequence of instructions and the updating of the register file memories according to the present invention.

DESCRIPTION OF THE PREFERRED EMBODIMENT

Figure 1:
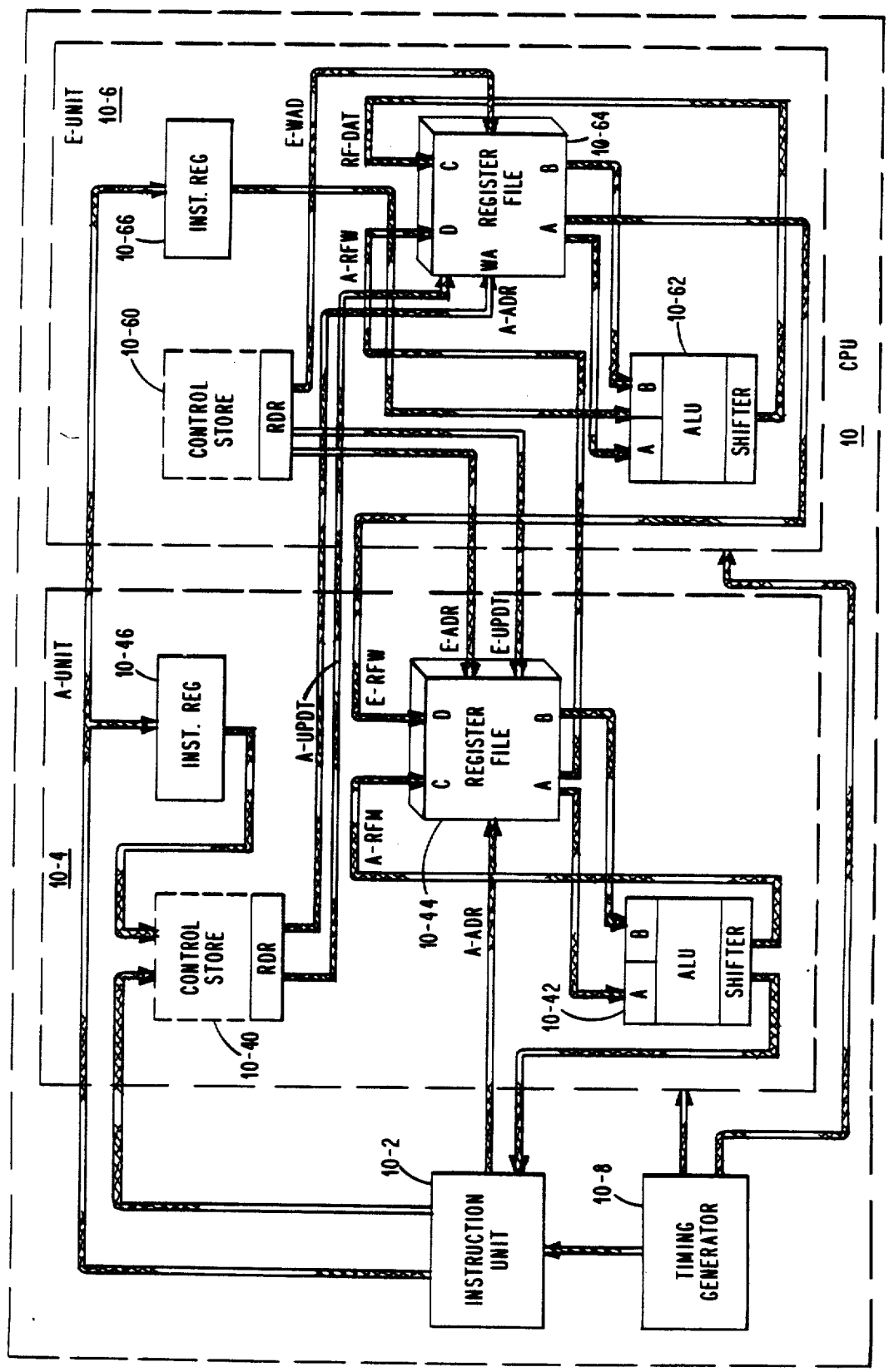
FIG. 1 is a block diagram of a pipelined processor which incorporates the register file memory organization of the present invention.

FIG. 1 shows in block diagram form, a pipelined processing unit (CPU) constructed according to the principles of the present invention. As seen from FIG. 1, the main elements of CPU 10 include an instruction unit 10-2, an A unit 10-4 and an E unit 10-6. The instruction unit 10-2 performs the functions of prefetching instructions from an instruction cache unit, not shown, and cracking each instruction fetched to determine how the other units, namely, the A unit 10-4 and the E unit 10-6 will process that instruction. The A unit 10-4 generates the addresses from instructions it receives from I unit 10-2 which are loaded into an instruction register 10-46. Additionally, it completes the execution of certain types of instructions (e.g. register to register instructions) thereby removing them from the pipeline in a production line fashion. The A unit 10-4 sends the virtual addresses it generates to a virtual memory management unit (VMMU), not shown, which translates the virtual addresses into physical addresses for accessing operands to be used by the E unit 10-6 in completing the execution of certain instructions received from I unit 10-2 and loaded into its instruction register of buffer 10-66. The operands are fetched from a data cache unit, not shown, and transferred to the E unit 10-6. For further information regarding the organization of the VMMU, I and E cache units, reference may be made to the related copending patent application.

As seen from FIG. 1, both the A unit 10-4 and E unit 10-6 include register file memories 10-44 and 10-64 which have a number of register locations used to store the contents of registers which are programmer accessible, that is, so-called software visible registers as further described herein. Also, each of the register file memories 10-44 and 10-64 also includes a number of private registers which are only accessible by the respective unit as further described herein. Additionally, the A and E units include microprogrammed control store units represented by the blocks 10-40 and 10-60. In the preferred embodiment, these elements are located off the A unit and E unit chips. Each of the control store units store sequences of microinstruction words which are read out and loaded into each of the RDR output registers for use in executing the instructions received from I unit 10-2. Lastly, the A and E units each include an arithmetic and logic unit (ALU) in addition to a shifter represented by blocks 10-42 and 10-62 for performing a variety of operations in response to instructions received from I unit 10-2. The operations and updating of the register file memories within I unit 10-2, A unit 10-4 and 10-6 as described herein are synchronized by signals provided by the timing generator circuits of block 10.

A UNIT AND E UNIT REGISTER FILE MEMORIES 10-44 AND 10-64

FIGS. 2a and 2b show in greater detail, the register file memory 10-44 of A unit 10-4 and the register file memory 10-64 of E unit 10-6. The register file memories 10-44 and 10-64 of FIGS. 2a and 2b include the same basic hardware elements. The A unit accesses the register file memories 10-44 and 10-64 on a double word basis, while the E unit accesses the register file memories 10-64 and 10-44 on a byte basis. Accordingly, the E unit 10-6 includes circuits which control writes on a byte basis.

Each register file memory has four 8-bit wide by 64 register locations of storage contained in RAMs 10-440a through 10-440d and 10-640a through 10-640d which are labeled RAM 0 through RAM 3. The RAMs are constructed from single port write dual port read RAMs. Each of the RAMs includes two 8×32 RAMs. In the preferred embodiment, the RAMs are organized as described in the related copending patent application of David E. Cushing, et al.

As seen from FIGS. 2a and 2b, each of the register file memories has 32 clocked D-type flip-flops 10-442 and 10-642 for storing a 32-bit data double word received from its ALU labeled as 4-byte register stages C0 through C3. The A unit also includes another group of 32 clocked D-type flip-flops 10-443 for storing a 32-bit data double word received from E unit 10-6 labeled as the 4-byte register stages D0 through D3. In the case of the E unit 10-6, these register stages are not required and, therefore, are shown as dotted block in FIG. 2b.

Each register file memory further includes 24 clocked D-type flip-flops 10-444 and 10-644 which store a RAM address received from the RDR register of its control store unit. These stages are shown in FIGS. 2a and 2b as the four sets of 6-bit character registers E0 through E3. The address received from the other unit's control store RDR register is stored in another set of 24 clocked D-type flip-flops 10-445 and 10-645, shown in FIGS. 2a and 2b as the four sets of 6-bit character registers F0 through F3.

The commands received by each unit from its respective control store RDR register are stored in four clocked D flip-flops 10-447a through 10-447d and 10-647a through 10-647d, one for each of the RAMs 0 through RAM 3 which are labeled in FIGS. 2a and 2b as flip-flops CC0 through CC3. The commands received from the control store RDR register of the other unit are stored in another set of four clocked D flip-flops 10-448a through 10-448d and 10-648a through 10-648d. These are labeled in FIGS. 2a and 2b as flip-flops DC0 through DC3.

It will be noted that each of the A and E units 10-4 and 10-6 includes a decoder circuit 10-450, 10-650 which, in response to the contents of its control store RDR register, generates the required command signals in addition to an update signal. The update signal is forwarded to the other unit's DC flip-flops. Since the E unit 10-6 operates on a byte basis, its decoder circuit provides individual command signals whose states determine which bytes of a double word are to be written.

The A unit and E unit update signals are generated as a function of both register file write address and write control fields included within the microinstructions read out into their RDR registers as a function of the types of program instructions being executed. For further information concerning the generation of these signals, reference should be made to an appendix which contains the Boolean equations for generating these signals. In accordance with the invention, the decoder circuits automatically inhibit the generation of the update signals when the address of one of the so-called private register locations is specified (i.e., hexadecimal address 30 or above).

The dual port read outputs A and B from RAMs 0 through 3 of the A unit register file memory 10-44 are stored in the sets of latches 10-454a through 10-454d labeled A-RFA0, A-RFB0 through A-RFA3, A-RFB3. As explained herein, data signals from outputs RDA and RDB of each RAM are transferred via position 0 of one of the sets of multiplexer circuits 10-452a through 10-452d in response to signals RDA and RDB which are generated by the compare circuits of block 10-470.

Similarly, the dual port read outputs RDA and RDB from RAMs 0 through 3 of the E unit register file memory 10-64 are stored in the sets of latches 10-654a through 10-654d labeled E-RFA0, E-RFB0 through E-RFA3, E-RFB3 in FIG. 2b.

As explained herein, the data signals from outputs RDA and RDB of each RAM are transferred via position 0 of one of the sets of multiplexer circuits 10-652a through 10-652d, in response to signals RDA and RDB generated by the compare circuits of block 10-670.

Both register file memories further include write selection control circuits 10-460a through 10-460d and 10-660a through 10-660d which generate the required sequence of write pulses which are applied to the write enable inputs of RAMs 0 through 3. As explained herein, these pulses enable the RAM 0 through RAM 3 to perform a dual write operation with a single write port. Each of the write selection control circuits includes a D-type flip-flop, a two input multiplexer circuit, an OR gate and an AND gate. In FIGS. 2a and 2b, these circuits are labeled 10-461a through 10-461d and 10-661a through 10-661d.

The write data contents of either register 10-442 or 10-443 of A unit 10-4 are applied to the write data inputs WD of the RAMs 0 through 3 via a two input multiplexer circuit 10-446a. At the same time, the write address contents of either register 10-444 or 10-445 are applied to the write address inputs WA of the RAMs 0 through 3 via another two input multiplexer circuit 10-446b.

In the case of the E unit 10-6, the write data contents of either register 10-642 or the output of the A unit register file memory 10-44 are applied to the write data inputs WD of RAMs 0 through 3 via a multiplexer circuit 10-646a. At the same time, the write address contents of either register 10-644 or 10-645 are applied to the write address inputs WA of RAMs 0 through 3 via another multiplexer circuit 10-646b. As shown in FIG. 2b, the E unit further includes an input multiplexer circuit 10-643 which loads one of two addresses from its control store RDR register as a function of the state of bit signal 79.

Both register file memories are dual read port memories. For the A unit 10-4, signals MXAAD0 through MXAAD5 and signals MXBAD0 through MXBAD5 are applied to the respective read address inputs RA and RB of the A unit RAMs. These 12 address signals are generated within the A unit by decoding the operand bits of the instruction stored in instruction register 10-46 of FIG. 1. In the case of E unit 10-6, signals E-RAD0 through E-RAD5 are generated by bits 31 through 37 of the control store RDR register. Signals E-RBD0 through E-RBD5 are generated by RDR register bits 39 through 44.

The A and E unit compare circuits 10-470 and 10-670 are used to detect the presence of conflicts. This enables data stored in the A unit registers 10-442 and 10-443 or the equivalent E unit registers to be transferred into the output latches 10-454a through 10-454d or 10-654a through 10-654d. The transfer proceeds via the "1" and "2" positions of the output multiplexer circuits 10-452a through 10-452d and 10-652a through 10-652d as a function of the states of signals CA0, CA1 and CB0, CB1 generated by compare circuits 10-470 and 10-670. This ensures that each register file memory always provides the most recent version of the data being requested. More specifically, when the compare circuits detect an identical comparison between write address selected and the read addresses applied to the RA and RB read ports of the A unit register file memory 10-44 (i.e., RA=RFWAD or E-ADR or RB=RFWAD or E-ADR), then corresponding ones of the signals CA0, CB0 and CA1, CB1 are forced to binary ONES. Similarly, when the E unit compare circuits detect an identical comparison between the write address selected and the read addresses applied to the RA and RB ports of the E unit register file memory 10-64 (i.e., RA=E-WAD or A-ADR or RB=E-WAD or A-ADR), then corresponding ones of the signals CA0, CB0 and CA1, CB1 are forced to binary ONES.

TIMING GENERATOR 10-8

Figure 2C:
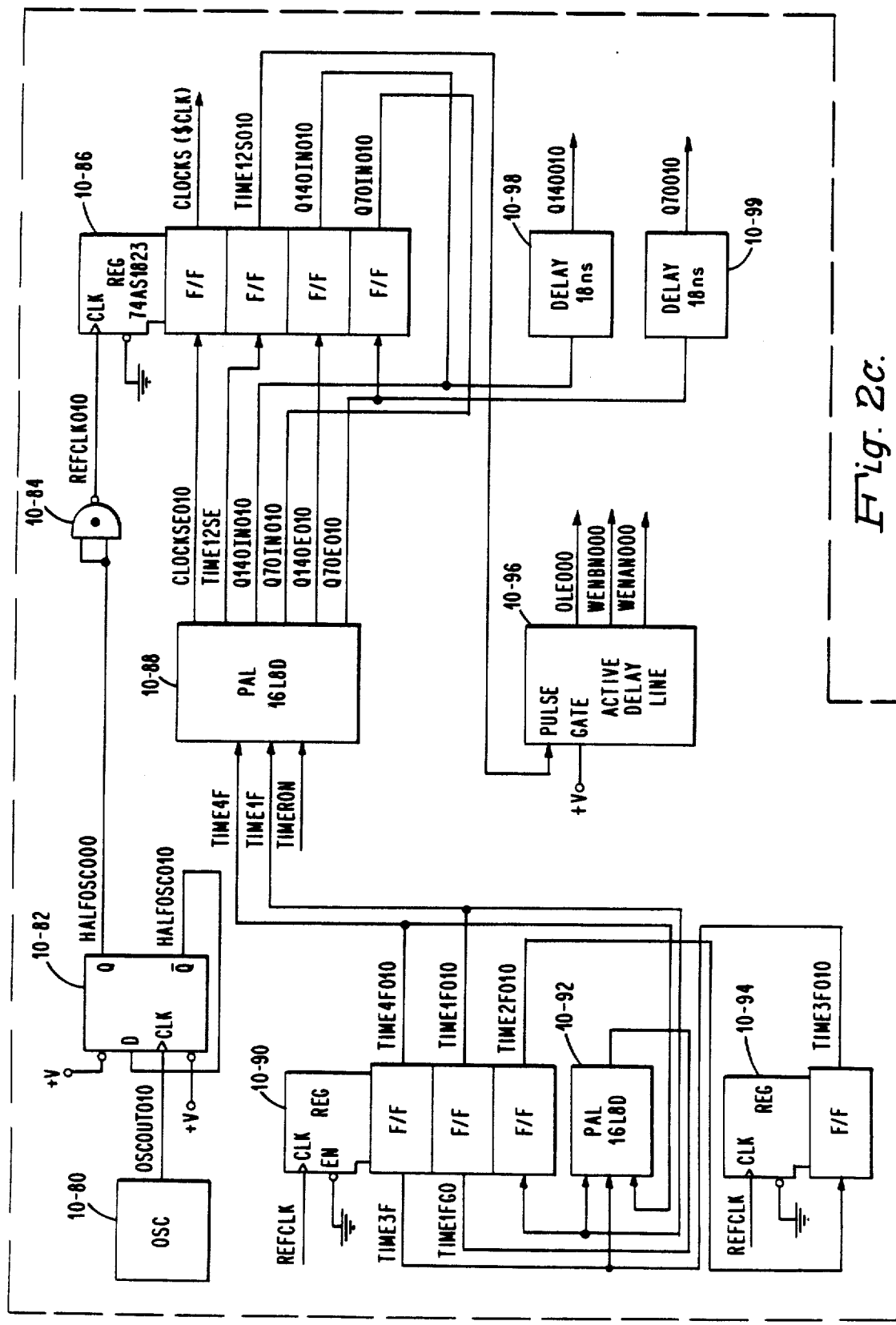

FIG. 2c shows in greater detail, the timing generator 10-8. As previously mentioned, the generator 10-8 provides the basic timing for the units of CPU 10 and, in particular, the timing signals required for operating the A and E unit register file memories 10-44 and 10-64. As seen from FIG. 2c, generator 10-8 includes a high frequence oscillator 10-8 which provides an 86.666 megahertz clocking signal which is divided down by a D flip-flop 10-82. The output HALFOSC000 is thereafter inverted by a NAND gate 10-84 to produce the reference clock signal REFCLK010.

As seen from FIG. 2c, signal REFCLK010 serves as the basic timing signal for the different registers 10-86, 10-90 and 10-94 as shown. The registers 10-90 and 10-92 together with a first programmable array logic (PAL) circuit 10-92 are used to generate the sequence of timing signals TIME1F010 through TIME4F010 having the relationships shown in FIG. 3a. The signals TIME4F010 and TIME1F010, applied to a second programmable array logic (PAL) circuit 10-88, produce signals Q70E010 and Q140E010. These signals are stored in register 10-86 and, after being delayed by one clock interval, are fed back as signals Q70IN010 and Q140IN010. These signals are applied to a pair of 18 nanosecond delay time circuits 10-98 and 10-99 which provide output timing signals Q140010 (Q140) and Q070010 (Q70).

The PAL circuit 10-88 uses signal Q140IN010 to generate clock signal CLOCKSE010 which is delayed by one clock interval by register 10-86 which produces output clock signal CLOCKS ($CLK). Signal TIME12SE is generated by combining timing signals TIME1F and TIME4F. After being delayed by one clock interval by register 10-86, signal TIME12S010 is applied to an active delay line circuit which generates output latch enable signal OLE000 (OLE), in addition to write enable A and B signals WENAN000 (WE- NAN) and WENBN000 (WENBN) having the relationship shown in FIG. 3a. The signals $CLK, Q70, Q140, OLE, WENAN and WENBN are applied to the A and E unit register file memories 10-44 and 10-64.

DESCRIPTION OF OPERATION

With reference to the timing diagrams of FIGS. 3a and 3b and instruction sequences of FIG. 4, the operation of the A and E unit register file memories 10-44 and 10-64 of FIGS. 2a and 2b will now be described. As previously mentioned, each register file memory contains the same contents for thirty-two program visible registers. These include seven general word operand registers, twelve address registers, seven general double-word operand registers, three control registers and three quad word scientific accumulators. These register locations can be loaded and read by various instructions.

In greater detail, these registers are assigned as follows. The register locations having hexadecimal addresses 01-07 in both register file memories are designated as registers R1 through R7. These registers are used as 16-bit word operand general registers and accumulators. The register locations having hexadecimal addresses 09 through 0F are designated as registers B1 through B7. These registers are used as 32-bit address registers for formulating addresses pointing to any instruction, data or arbitrary locations in the virtual memory allocated to a process.

The register locations having hexadecimal addresses 11 through 17 are designated as registers K1 through K7. These registers serve as the 32-bit double word general registers and accumulators. The register locations having hexadecimal addresses 20, 26 and 27 are designated as control registers. These include an S register which contains process state security information and mode registers M1 through M7. The register locations having hexadecimal addresses 21 through 25 are designated as address registers. For example, the register location having hexadecimal address 23 is designated as a 32-bit Remote Descriptor Base Register (RDBR) which is used to specify the address of a remote descriptor. The register locations having hexadecimal addresses 1A through 1F are designated as 64-bit scientific accumulators used in the execution of scientific instructions.

Because both the A and E units execute instructions, the contents of these program visible registers stored in the register file memories 10-44 and 10-64 must contain the same information. According to the teachings of the present invention, whenever the content of a program visible register location in the A unit register file memory is changed, the corresponding register location in the E unit register file memory is automatically updated during the next CPU cycle. Similarly, when the content of a program visible register location in the E unit register file memory is changed, the corresponding register location in the A unit register file memory is automatically updated during the next cycle. The updating operations are carried out such that the register file memories collectively operate as a single register file memory.

In the E unit, the sixteen register locations having hexadecimal addresses 30 through 3F are designated as private registers. More specifically, the first nine of these register locations serve as working registers. The remaining register locations are used for storing message passing information between microinstruction routines and scientific exponent information. Similarly, in the A unit, the sixteen register locations having hexadecimal addresses 30 through 3F are designated as private registers. More specifically, these are used by A unit for storing constants used for address development when the E unit is controlling the operation of pipeline. In other cases, these register locations are for storing control information used in conjunction with the operation of certain interface units.

The above updating operations will now be described by considering FIGS. 3a, 3b and 4. FIGS. 3a and 3b illustrate the timing signals generated during successive CPU or machine cyles of operation. As seen from FIG. 3a, each A unit and E unit cycle or CPU cycle is 140 nanoseconds. This cycle is actually divided into two halves for enabling a control store double pump operation which is described in a related copending application of the same name. However, for the purposes of the present invention, the cycle may be considered as being 140 nanoseconds.

Figure 3A:
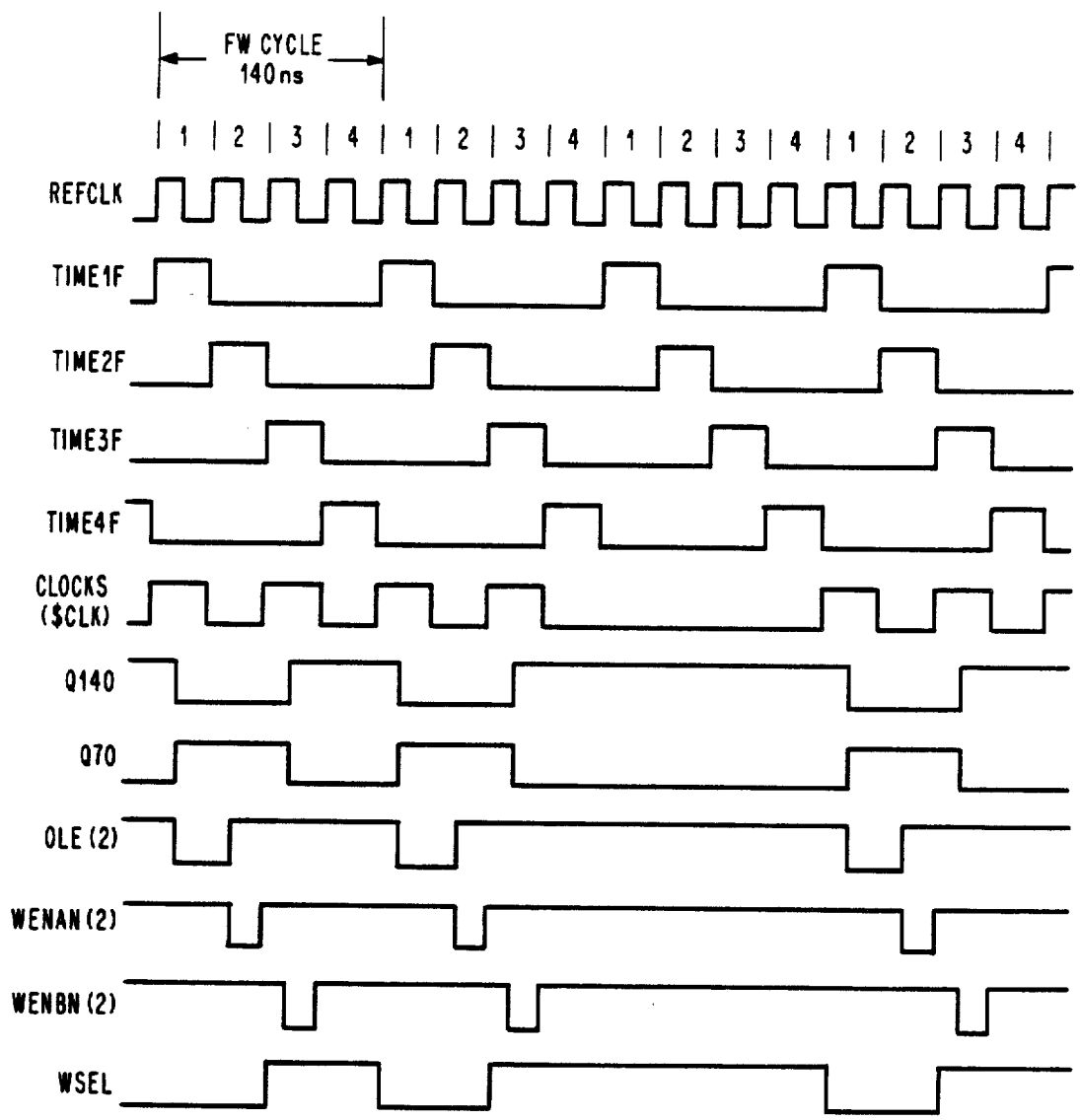
FIGS. 3a and 3b are timing diagrams used to explain the operation of a preferred embodiment of the present invention.
Figure 3B:
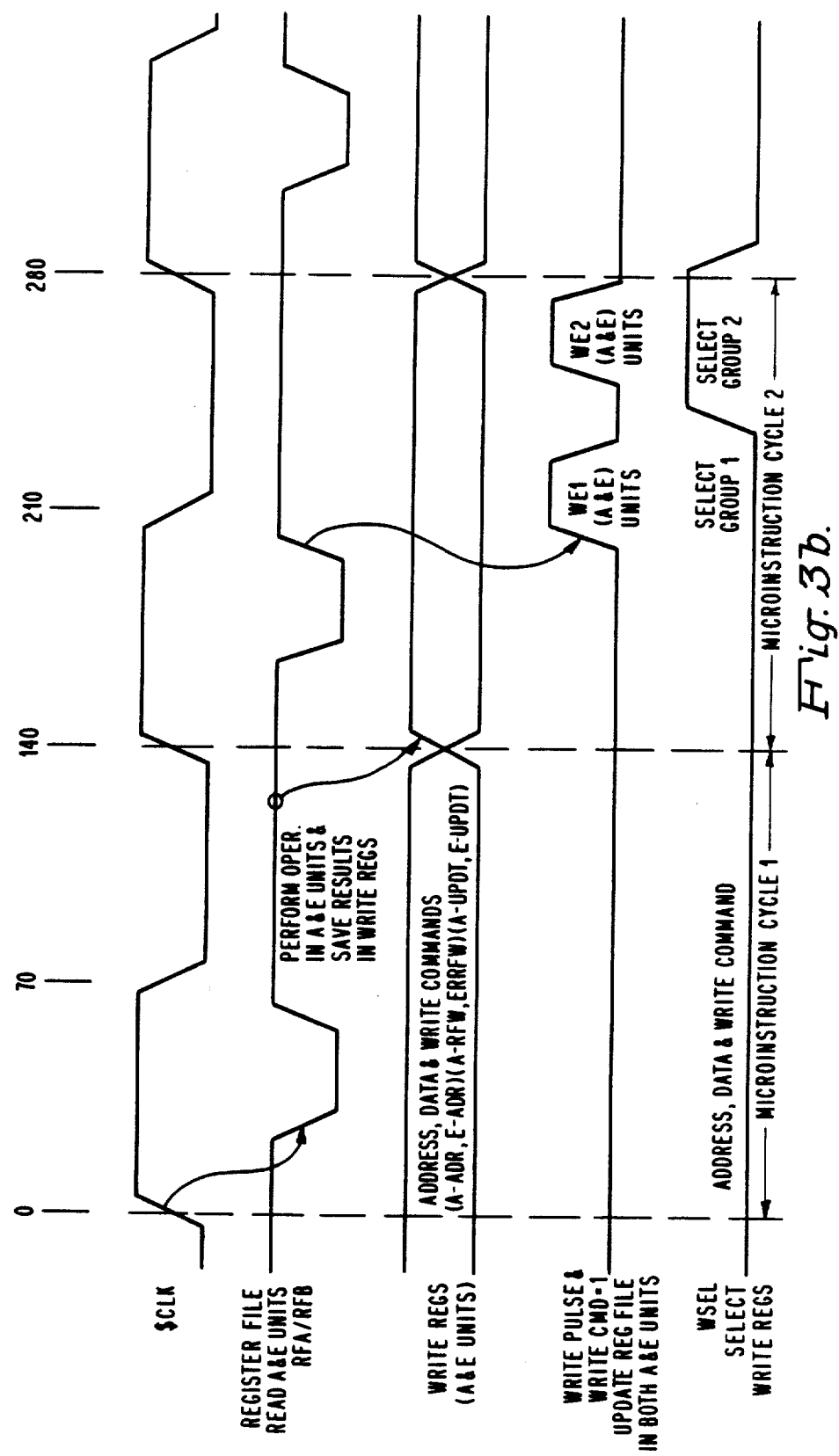

During the first CPU cycle of FIG. 3b, the contents of different register locations of the A and E unit register file memories 10-44 and 10-64 are read out from RAMs 0 through 3 and stored in the latches 10-454a through 10-454d and 10-654a through 10-654d, in response to output latch enable signal OLE. This signal goes low near the start of the cycle and remains low for approximately 18 nanoseconds. Upon returning to a high or binary ONE state, it causes the latches to apply the contents of the addressed register locations as inputs to the A and E unit ALU's 10-42 and 10-62.

During the remaining part of cycle 1 of FIG. 3b, the A and E units perform the operations specified by the instructions stored in instruction registers 10-46 and 10-66 of FIG. 1.

It will be assumed that the operations performed by the A and E units result in changes in certain register locations of their respective register file memories.

As seen from FIG. 3b, the contents of A and E unit control store RDR registers are decoded by decoder circuits 10-450 and 10-650. This results in the generation of the A unit update signal A-UPDT and E unit update signal E-UPDT, in that the specific instructions being executed by the A and E units are going to change the contents of the register file memories. The signal A-UPDT is generated at the beginning of the first half of the cycle when the specified bits used to generate this signal (i.e., bits 12-13) are loaded into its RDR register. The signal E-UPDT is generated at the end of the first half of the cycle when the specified bits used to generate this signal (bits 80-82) are loaded into its RDR register.

As seen from FIG. 3b, near the end of the cycle, the results generated by the A and E ALU's applied inputs to their respective register file memories through write data register 10-442 and 10-642 are clocked into the registers in response to signals $CLK and Q140. Also, at that time, the appropriate write addresses are clocked into write address registers 10-444 and 10-644. The associated command flip-flops 10-447a through 10-447d and 10-647a through 10-647d were previously set to binary ONES by the signals A-UPDT and E-UPDT.

The results generated by the A and E unit ALU's are also applied as inputs to each other's register file memory. In the case of A unit 10-44, the E unit results are clocked into write data register 10-443. Also, at that time, the appropriate write addresses are clocked into the write address registers 10-445 and 10-645. However, to reduce delays and improve performance, the outputs of the A unit write data register 10-442 containing the results produced by the A unit are applied as write data inputs to multiplexer circuit 10-646a. As previously mentioned, the command flip-flops were previously set by the update signals A-UPDT and E-UPDT. Thus, at the completion of cycle 1, the write data address and command registers within both the A and E units contain the results produced by these units which are to be written into both register file memories.

As seen from FIG. 3b, the next cycle is a write cycle. During the first portion of cycle #2 as in cycle #1, register locations within the register file memories may be read. The timing of the write enable signals WENAN and WENBN is such that signal WENAN starts slightly afer the rise or positive going edge of output latch enable signal OLE which is 50 nanoseconds immediately after the read portion of the cycle is completed. When signal WENAN goes high or to a binary ONE, it causes OR gates 10-461c and 10-661c to apply binary ONES as inputs to AND gates 10-461d and 10-661d of each of the write control selection blocks 10-460a through 10-460d and 10-660a through 10-660d. The initial switching of signal OLE to a binary ZERO cleared to ZEROS the write select flip-flops 10-461a and 10-661a of each of the blocks 10-460a through 10-460d and 10-660a through 10-660d. Therefore, as seen from FIG. 3a, the write selection signal remains in a binary ZERO state. This causes the A unit multiplexer circuits 10-464a and 10-464b and E unit multiplexer circuits 10-664a and 10-664b to apply the data, address and command contents of registers 10-442, 10-444, 10-447a through 10-447d and 10-642, 10-644, 10-647a through 10-647d to the write data (WD), write address (WA) and write enable (write pulse) inputs of each of the RAMs 0 through 3. Thereafter, the signal WENAN is applied as a first write pulse to each of the RAMs 0 through 3 resulting in the specified register locations in both register file memories being updated to reflect changes made by its respective unit.

As seen from FIGS. 3a and 3b, when signal WENAN goes low at about 90 nanoseconds, it causes the write select flip-flops 10-461a and 10-661a of each of the blocks 10-460a through 10-460d and 10-660a through 10-660d to switch to binary ONES. Thereafter, signal WENBN goes high or to a binary ONE at approximately 105 nanoseconds. When write select signal WSEL is in a binary ONE state, it causes the A unit multiplexer circuits 10-464a and 10-464b and E unit multiplexer circuits 10-664a and 10-664b to apply the data address and command contents of registers 10-443, 10-445, 10-448a through 10-448d and 10-442, 10-645, 10-648a through 10-648d to the write data (WD), write address (WA) and write enable (write pulse) inputs of each of the RAMs 0 through 3.

Thereafter, the signal WENBN is applied as a second write pulse to each of the RAMs 0 through 3 resulting in the specified register locations in both register file memories being updated to reflect changes made by the other unit. Signal WENBN goes low at approximately 130 nanoseconds. The write select flip-flops remain in a binary ONE state until the occurrence of the next OLE signal. If the data to be written into a register location of one or both of the register file memories is required to be used during that same cycle, it will be transferred via the multiplexer circuits 10-452a through 10-452d and 10-652a through 10-652d into the output latches 10-454a through 10-454d through 10-654a through 10-654d. Therefore, the most recent data contents are provided without incurring any delays in the performance of the A and E units.

FIG. 4 illustrates from the overall system how the A and E unit register file memories are updated without any loss in cycles. Briefly, it is assumed that the sequence of instructions which consists of a load B1 register instruction, a load B2 register instruction, a load B3 register instruction and an odd instruction ADDR3 are applied to the pipeline stages of FIG. 4 which include A unit 10-4 and E unit 10-6. As seen from FIG. 4, the first three instructions are fetched and decoded by the I fetch and I unit 10-2. This results in the A unit 10-4 generating virtual addresses which, after being converted to physical addresses by the VMMU, are used to fetch the specified operands from the operand cache unit in order that the E unit 10-6 complete the execution of these instructions. Instruction execution involves storing the operands in the B1, B2 and B3 register locations of the E unit's register file memory 10-64.

The add instruction is fetched and decoded by the I fetch and I unit 10-2. The execution of this instruction can be performed by the A unit 10-4. As seen from FIG. 4, the A unit 10-4 reads the specified operand from register location R3 of its register file memory 10-44. Thereafter, the ALU of the A unit performs the required addition and stores the result into register location R3.

During cycle 6 of the sequence, both the A and E units cause changes in the contents of shared register locations within their register file memories. As a result of this, the control store units provide update signals A-UPDT and E-UPDT which set the write command flip-flops in the other unit. Accordingly, in the next successive cycle, cycle 7, the updated contents of the shared register locations in each unit are updated to reflect the changes made by the other unit. In response to a common clock signal Q140, both register file memories are updated. In the worst case, both the A and E unit register files will have the same information available during the next CPU cycle. If either the A or E unit requires the same information which is being written into a register location, this condition will be detected by the comparison circuits (i.e., 10-470 and 10-670). This information will be provided through their respective output multiplexer circuits.

From the above, it is seen how register file memories located in two independently operated units are automatically updated. The timing of the system is such that during a CPU cycle, information is transferred from the E unit 10-6 to the A unit 10-4 for updating the content of an A unit register location. During the same CPU cycle, information is transferred from A unit 10-4 to E unit 10-6 for updating the content of an E unit register location. To further increase performance and decrease space, the write data register of the A unit 10-4 is used directly as the source for E unit update operations. Additionally, means are provided which automatically maintain in tact, the contents of private locations to be used exclusively by a unit for carrying out its own operations.

APPENDIX

The equations for generating the signals of FIGS. 3a and 3b are given by the following Boolean expressions.

A-UPDT =                                                                  1.

-continued $$\overline{RFWAD(0)}\&\overline{RFWAD(1)}\&(RDR(12)+RDR(13))\&\overline{HOLD}.$$

E-UPDT =

$$\overline{E\text{-}WAD(0)}\&E\text{-}WAD(1)\&(RDR(80)+RDR(81)+$$

$$RDR(82))\&\overline{G\text{-}ECHOLD}.$$

Wherein, signals $\overline{HOLD}$ and G-ECHOLD indicate that the unit is ready to execute; signals RFWAD0-1 and E-WAD0-1 define write addresses having values greater than hexadecimal 30, signals RDR 12-13 define an RF write enable and select field, and RDR 80-82 define an RF write control field.

The RDR bits 12-13 are coded as follows:
00 - no write;
01 - write using A address;
10 - write using B address; and
11 - write into working locations.
The RDR bits 80-82 are coded as follows:

```
000  = no write;
001 = RFW  = write double word to register file;
010 = RFWL = write left word to register file;
011 = RFWR = write right word to register file;
100 = FRWB0 = write byte 0 to register file;
101 = RFWB1 = write byte 1 to register file;
110 = RFWB2 = write byte 2 to register file; and
111 = RFWB3 = write byte 3 to register file.
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A data processing system for processing instructions by passing each instruction through a plurality of series connected pipeline stages during a corresponding number of cycles of operation, said system comprising:
  a pair of instruction processing stages, each of said stages including:
    register file memory means having a plurality of memory locations, a number of said plurality of memory locations being allocated for storing program information to be shared by said pair of processing stages;
    and program control means for generating sequences of control signals for executing instructions passed through said each processing stage, said program control means being coupled to said register file memory means for generating update control signals for those instructions specifying access to any one of said number of memory locations;
  means for interconnecting said program control means of each instruction processing stage to said register file memory means of another processing stage; and
  common timing and control means for generating a sequence of timing signals during each cycle of operation for synchronizing the operations of said pipeline stages, said timing and control means being coupled to apply said sequence of timing signals to said register file memory means of each stage, for updating the contents of said any one of said number of register file memory locations of said pair of stages during successive cycles of operation in response to said update control signals for completing the execution of said instructions within a minimum amount of time.

2. The system of claim 1 wherein said register file memory means of each processing stage includes a number of clocked registers, each of said number of registers having a plurality of inputs and outputs, each stage including an arithmetic and logic unit coupled to said inputs of a first one of said number of clocked registers; and,
  said interconnecting means connecting said outputs of said first one of said number of clocked registers of at least one of said processing stages to said register file memory means of another one of said processing stages for sharing said one register for storing signals from said arithmetic and logic unit of said one processing stage required for updating the content of storage locations within said register file memory means for said pair of processing stages.

3. The system of claim 2 wherein said each processing stage further includes decoder circuit means coupled to said program control means and to said register file memory means, said decoder circuit means of one of said pair of stages for generating a plurality of write control signals in response to said sequences of control signals for updating said content of said storage locations on a byte basis and said decoder circuit means of said another one of said pair of stages for generating write control signals in response to said sequences of control signals for updating said content of said storage locations on a word basis.

4. The system of claim 1 wherein each of said program control means includes:
  a control store having a plurality of locations for storing sequences of microinstructions used to execute said instructions, each of said number of microinstructions contained in said sequences including a write control field coded for specifying when a register file write operation is to be performed and a write address field for designating a register file write address; and,
  decoder circuit means connected to said control store, said decoder circuit means generating said update control signals in response to each microinstruction whose write control fields specify write register file operations when said write address field designates one of said number of plurality of memory locations.

5. The system of claim 4 wherein said control store of each stage in response to each instruction specifying a register operation reads out one of said number of microinstructions containing said write control and write address fields coded for enabling writing and updating of said one of said number of said register file storage locations.

6. The system of claim 4 wherein said plurality of memory locations of said register file memory means of each stage include a group of private storage locations used for performing its own operations, said decoder circuit means in response to each microinstruction containing said write control field specifying said write register file operation and said write address field designating one of said group of private locations, inhibiting generation of said update signal and enabling the content of said one of said group of private locations of said register file memory means of only said stage to be updated.

7. The system of claim 1 wherein each of said pair of stages is constructed on a separate integrated circuit chip.

8. The system of claim 7 wherein one of said pair of stages is an address generation unit and another of said pair of stages is an execution unit.

9. The system of claim 2 wherein each of said sequence of timing signals includes a control signal defining an end of said each cycle of operation, said number of clocked registers of each register file of each stage being simultaneously enabled by said control signal to store said information from said arithmetic and logic unit of said another stage for updating the content of said memory location of said register file memory of said one stage at the end of said each cycle of operation.

10. A data processing system for processing instructions by passing each instruction through a plurality of series connected pipeline stages during a corresponding number of cycles of operation, said system comprising:
 a first instruction processing stage constructed on a first integrated circuit chip, said first stage including:
  a register file memory having a plurality of memory locations, a number of said plurality of memory locations being allocated for storing program information to be shared by a second instruction processing stage; and
  microprogram control means for generating sequences of control signals for executing instructions passed through said first processing stage, said program control means being coupled to said register file memory for generating update control signals for those instructions specifying access to any one of said number of memory locations;
 a second instruction processing stage constructed on a second integrated circuit chip, said second stages including:
  a register file memory having a plurality of memory locations, a number of said plurality of memory locations being allocated for storing program information to be shared by said pair of processing stages; and,
  microprogram control means for generating sequences of control signals for executing instructions passed through said each processing stage, said program control means being coupled to said register file memory means for generating update control signals for those instructions specifying access to any one of said number of memory locations;
  means for interconnecting said microprogram control means of said first and second instruction processing stages to said register file memory of said second and first processing stages respectively; and
 common timing and control means for generating a sequence of timing signals during each cycle of operation for synchronizing the operations of said pipeline stages, said timing and control means being coupled to apply said sequence of timing signals to said register file memory means of said first and second stages, for updating the contents of said number of register file memory locations of said stages during successive cycles of operation in response to said update control signals for completing the execution of said instructions by said first and second stages within a minimum amount of time.

11. The system of claim 10 wherein said register file memory of said first and second processing stages includes a number of clocked registers, each of said number of registers having a plurality of inputs and outputs, and each of said first and second stages further including an arithmetic and logic unit coupled to said inputs of a first one of said number of clocked registers; and,
 said interconnecting means connecting said outputs of said first one of said number of clocked registers of at least said first processing stage to said register file memory of said second processing stage for sharing said one register for storing signals from said arithmetic and logic unit of said first processing stage required for updating the content of storage locations within said register file memory means of said processing stages.

12. The system of claim 11 wherein said first and second processing stages each further include decoder circuit means coupled to said microprogram control means and to said register file memory, said decoder circuit means of said second processing stage for generating a plurality of write control signals in response to said sequences of control signals for updating said content of said storage locations on a byte basis and said decoder circuit means of said first stage for generating write control signals in response to said sequences of control signals for updating said content of said storage locations on a word basis.

13. The system of claim 10 wherein each of said microprogram control means includes:
 a control store having a plurality of locations for storing sequences of microinstructions used to execute said instructions, each of said number of microinstructions contained in said sequences including a write control field coded for specifying when a register file write operation is to be performed and a write address field for designating a register file write address; and,
 decoder circuit means connected to said control store, said decoder circuit means generating said update control signals in response to each microinstruction whose write control fields specify write register file operations when said write address field designates one of said number of plurality of memory locations.

14. The system of claim 13 wherein said control store of each stage in response to each instruction specifying a register operation reads out one of said number of microinstructions containing said write control and write address fields coded for enabling writing and updating of one of said number of said register file storage locations.

15. The system of claim 13 wherein said plurality of memory locations of said register file memory means of said first and second stages each include a group of private storage locations used for performing its own operations, said decoder circuit means in response to each microinstruction containing said write control field specifying said write register file operation and said write address field designating one of said group of private locations, inhibiting generation of said update signal and enabling the content of said one of said group of private locations of said register file memory of only said stage to be updated.

16. The system of claim 10 wherein said first stage is an address generation unit and said second stage is an execution unit.

17. The system of claim 11 wherein each of said sequence of timing signals includes a control signal defining an end of said each cycle of operation, said number of clocked registers of each register file of said first and second stages each being simultaneously enabled by said control signal to store said information from said arithmetic and logic unit of the other stage for updating the content of said memory locations of said register file memories at the end of said each cycle of operation.

18. A method of organizing a register file memory system for use in a pipelined data processing unit having series connected pipeline stages for performing different operations on each instruction applied to said data processing unit in which a pair of said stages are constructed from separate integrated circuit chips, said method comprises the steps of:
including in each stage of said pair of stages a register file memory having a plurality of memory locations and storage decoder means for providing sequences of control signals for executing instructions passed through said each stage;
interconnecting said decoder means of each stage to said register file memory of said other stage;
generating update signals by said decoder means for application to said other stage in response to each instruction passed through said each stage which specifies a register operation; and,
applying a common set of timing signals during each cycle of operation simultaneously to said register file memory of each stage for updating the contents of register file locations during successive cycles of operation in response to said update signals.

19. The method of claim 18 wherein said method further includes the step of:
generating said update signals only when said each instruction specifies said register operation which involves accessing any one of a first number of storage locations for reserving other locations for private use.

* * * * *